United States Patent
Matsuo

(10) Patent No.: US 7,324,466 B2
(45) Date of Patent: Jan. 29, 2008

(54) ECHO CANCELING SYSTEM AND ECHO CANCELING METHOD

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 876 days.

(21) Appl. No.: 10/648,319

(22) Filed: Aug. 27, 2003

(65) Prior Publication Data

US 2004/0042616 A1    Mar. 4, 2004

(30) Foreign Application Priority Data

Aug. 28, 2002   (JP)   ............................. 2002-249548

(51) Int. Cl.
*H04B 3/20*   (2006.01)

(52) U.S. Cl. .................. 370/286; 379/406.01

(58) Field of Classification Search ...... None
See application file for complete search history.

(56) References Cited

U.S. PATENT DOCUMENTS

2002/0075818 A1*  6/2002  Matsuo ...................... 370/286

FOREIGN PATENT DOCUMENTS

JP        2000-115351        4/2000

* cited by examiner

*Primary Examiner*—Ramnandam Singh
(74) *Attorney, Agent, or Firm*—Staas & Halsey LLP

(57) ABSTRACT

An echo canceling system and an echo canceling method are provided, which can deal with the case where there are a plurality of echo paths and respond to the variation in echo arrival times. An echo canceling method to be applied to a full-duplex communication system includes detecting a respective echo arrival time of one or plural echo paths based on a reference signal and an echo signal, calculating as many pseudo-echo signals as the detected arrival times, overlapping the calculated pseudo-echo signals to obtain an overall pseudo-echo signal, and subtracting the overall pseudo-echo signal from the echo signal. A FFT processing is performed with respect to the reference signal and the echo signal, and a similar canceling processing is carried out using an amplitude spectrum alone.

8 Claims, 10 Drawing Sheets

ECHO CANCELING SYSTEM AND ECHO CANCELING METHOD

BACKGROUND OF THE INVENTION

1. Field of the Invention

The present invention relates to an echo canceling system and an echo canceling method applied to a full-duplex communication system, an automatic voice interaction system and the like.

2. Description of Related Art

With a widespread use of the internet, various types of services utilizing the internet have become available. For example, what is called a computer telephony system using a technology such as VoIP (Voice Over IP) has been applied to various applications. The following is a description of a full-duplex communication system using a conventional VoIP technology.

FIG. 1 is a diagram schematically showing the full-duplex communication system. In FIG. 1, numerals 10 and 20 denote speakers. The following description is directed to an example of the case where the speaker 10 speaks and the voice of the speaker 10 is transmitted to the side of the speaker 20 as a conversation partner. In FIG. 1, numerals 11 and 21 denote microphones, numerals 12 and 22 denote loudspeakers, numerals 13 and 23 denote VoIP applications, numerals 14 and 24 denote terminals, and numeral 30 denotes the internet. A communication interface and other devices are omitted for convenience.

First, when the speaker 10 inputs voice to the microphone 11, the VoIP application 13 receives a voice signal corresponding to this voice and performs necessary processings such as a sampling, so as to be transmitted from the terminal 14 to the internet 30 as packet data. According to the routing on the internet, respective packet data reach the predetermined terminal 24, on which these packet data are assembled sequentially and subjected to necessary processings by the VoIP application 23, then outputted from the loudspeaker 22 as voice.

The voice outputted from the loudspeaker 22 not only reaches the conversation partner 20, but also sometimes is re-inputted to the microphone 21 as wrap-around voice. In this case, the voice re-inputted from the microphone 21 is transmitted via the VoIP application 23 in the terminal 24, the internet 30 and the VoIP application 13 in the terminal 14, thus being outputted from the loudspeaker 12 as voice containing an echo. This forms a kind of loop, leading to echo generation.

In a path that forms this loop generating the echo (an echo path), transmission delay is generated. In other words, the speaker 10 hears the voice that he/she inputted to the microphone 11 from the loudspeaker 12 a little later. Accordingly, the speaker 10 finds it very difficult to talk and listen to the voice of the partner.

Also, when the echo level is very high so that the echo diverges without fading, a phenomenon called howling occurs, which makes it difficult to have a conversation itself.

In order to solve these problems, echo cancellers often have been used. FIG. 2 is a diagram schematically showing an echo canceling system using the example of echo canceller. In FIG. 2, the terminal 14 on the side of the speaker 10 has an echo canceller 15. The echo canceller 15 receives a signal to be outputted through the loudspeaker 12 as an input and subtracts from this received signal a portion corresponding to the input signal from the microphone 11, thereby canceling a voice signal that has been undesirably headed and re-inputted to the microphone 21.

The echo canceller 15 includes a sound characteristics detecting portion 151, an adjusting portion 152 and an echo canceling processing portion 153. Signals inputted to the echo canceller 15 are a voice signal of the speaker 10 and a response signal returned via an echo path, while a signal outputted therefrom is a voice signal to be outputted to the loudspeaker 12.

The sound characteristics detecting portion 151 detects sound characteristics information of the echo path seen from the speaker side. More specifically, the sound characteristics information of the echo path is detected from the voice signal and the response signal returned via the echo path. For example, adjustments are made such that a difference between a processed signal obtained by arithmetically processing the voice signal and the response signal becomes "zero", thereby obtaining the sound characteristics information of the echo path.

The adjusting portion 152 receives the adjustment for echo canceling by the speaker and generates the tuning signal.

The echo canceling processing portion 153 generates an echo canceling signal from the voice signal based on the sound characteristics information detected by the sound characteristics detecting portion 151 and subtracts the portion corresponding to the echo canceling signal from the voice signal returned from the system on the conversation partner side, thereby canceling the echo.

FIG. 3 illustrates an example of a specific module configuration, mainly showing the echo canceller 15. Numeral 31 denotes a sound characteristics filter including a FIR filter (finite impulse response filter) etc., numeral 32 denotes a coefficient updating unit, and numerals 33 and 34 denote subtracting units. Numeral 35 denotes a gain controller.

The relationship between each portion in the echo canceller 15 shown in FIG. 2 and the specific module shown in FIG. 3 will be described in the following.

The sound characteristics detecting portion 151 in FIG. 2 corresponds to the sound characteristics filter 31, the coefficient updating unit 32 and the subtracting unit 33 in FIG. 3. The sound characteristics detecting portion 151 detects the sound characteristics information of the echo path seen from the speaker side from the voice signal (a signal a in FIG. 3) serving as a reference signal and an echo signal (a signal b in FIG. 3) returned via the echo path. For example, as described below, a differential signal (a signal d in FIG. 3) between the signal (a signal f in FIG. 3) obtained by arithmetically processing the voice signal by the sound characteristics filter 31 and the echo signal (the signal b in FIG. 3) is calculated by the subtracting unit 33. Then, adjustments are made by the coefficient updating unit 32 such that the power of this differential signal d becomes "zero." As a result, the coefficient of the sound characteristics filter 31 becomes a coefficient for calculation corresponding to the sound characteristics information of the echo path.

The adjusting portion 152 in FIG. 2 corresponds to the gain controller 35 in FIG. 3, which has an external input means that allows an adjustment by the speaker, so that the speaker can adjust a gain amount of the gain controller 35 by him/herself. The gain coefficient g can be adjusted in the range, for example, from 0.0 to 1.0. When the gain coefficient g is 0.0, the echo canceling processing is not performed. In other words, by adjusting the gain amount, the speaker can choose execution or suspension of the echo canceling processing of the echo canceling processing portion.

The echo canceling processing portion 153 in FIG. 2 corresponds to the sound characteristics filter 31, the gain controller 35 and the subtracting unit 34 in FIG. 3. In generating the echo canceling signal, the sound characteristics filter 31, in which the coefficient is adjusted as the sound characteristics detecting portion 151, processes arithmetically the received voice signal (the signal a in FIG. 3) serving as the reference signal by reflecting the sound characteristics information (the signal f in FIG. 3). Then, an adjustment is made by the speaker with the gain controller 35 so as to generate the echo canceling signal (a signal c=g·f in FIG. 3). Subsequently, in the subtracting unit 34, the portion corresponding to the echo canceling signal (the signal c in FIG. 3) is subtracted from the echo signal (the signal b in FIG. 3) that is returned from the system on the partner side, thereby generating a signal (a signal e in FIG. 3) in which an echo is canceled, so as to be outputted to the loudspeaker 12.

However, it is rare that only a single echo path is present in a general full-duplex communication system. Usually, there are a plurality of echo paths, instead. Even in a simple example where IP networks and telephone networks are connected as shown in FIG. 4, it is possible to assume a plurality of echo paths, that are, an echo path 1 up to an exchange 1 connecting the IP network and the telephone network and an echo path 2 up to a PBX 2 connecting the second IP network and the telephone network, other than an echo path 3 up to a terminal B.

In such cases, even when a filter coefficient corresponding to the echo path 1 is updated with the echo canceller 15, little echo canceling effect can be expected for the other echo paths.

The reason is that, since echo arrival times for the echo paths 2 and 3 are later than an echo arrival time for the echo path 1, each order in the filter, that is, the number of samples in which echo control can be performed, corresponding to the echo path 2 or 3 exceeds an order in the filter corresponding to the echo path 1, and therefore, a conventional echo canceller cannot output an appropriate signal as a pseudo-echo signal $c_i$, which is an output signal of the FIR filter.

Furthermore, it also is possible to assume a case in which the sound-reflecting conditions on walls and ceilings vary or a case in which the echo arrival time itself fluctuates due to variation in surrounding factors such as positional changes in microphones or loudspeakers. In those cases, there also has been a problem that the pseudo-echo signal $c_i$ in the conventional echo canceller achieves less echo canceling effects.

SUMMARY OF THE INVENTION

It is an object of the present invention to solve the problems described above and to provide an echo canceling system and an echo canceling method that can deal with the case where there are a plurality of echo paths and respond to the variation in echo arrival times.

In order to achieve the above-mentioned object, an echo canceling system according to the present invention is an echo canceling system provided in a full-duplex communication system. The system includes an arrival time detecting portion for detecting a respective echo arrival time of one or plural echo paths based on a reference signal and an echo signal, a pseudo-echo calculating filter for calculating as many pseudo-echo signals as the detected arrival times, an adding unit for overlapping the calculated pseudo-echo signals to obtain an overall pseudo-echo signal, and a subtracting unit for subtracting the overall pseudo-echo signal from the echo signal.

With this configuration, by detecting the echo arrival time for each echo path and generating the pseudo-echo signal according to this echo arrival time, it is possible to cancel echo in each echo signal effectively even when there are a plurality of different echo paths.

Also, in the echo canceling system according to the present invention, it is preferable that the arrival time detecting portion calculates a correlation coefficient between the reference signal and the echo signal and detects a time difference as the arrival time in a case where the correlation coefficient is larger than a predetermined threshold. This is because a high correlation implies a high possibility that the echo signal is a wrap-around input with a delay by this time difference.

Next, in order to achieve the above-mentioned object, an echo canceling system according to the present invention is an echo canceling system provided in a full-duplex communication system. The system includes a window multiplication/orthogonal transformation processing portion for performing an orthogonal transformation processing such as an FFT (a fast Fourier transform) for a window length based on a reference signal and an echo signal to obtain an amplitude spectrum and a phase spectrum of each of the reference signal and the echo signal, an arrival time detecting portion for detecting echo arrival times of one or plural echo paths based on the amplitude spectrum of the reference signal and the amplitude spectrum of the echo signal, a pseudo-echo calculating filter for calculating as many amplitude spectra of pseudo-echo signals as the detected arrival times, an adding unit for overlapping the calculated amplitude spectra of the pseudo-echo signals to obtain an amplitude spectrum of an overall pseudo-echo signal, a subtracting unit for subtracting the amplitude spectrum of the overall pseudo-echo signal from the amplitude spectrum of the echo signal to obtain an amplitude spectrum of an echo canceling signal, and an inverse orthogonal transformation/overlap processing portion for performing an inverse orthogonal transformation processing such as an IFFT based on the amplitude spectrum of the echo canceled signal and the phase spectrum of the echo signal, followed by an overlap processing, to obtain an echo canceled signal.

With this configuration, by performing the echo canceling processing using only the amplitude spectrum, which is less susceptible to fluctuations of the arrival times, it becomes possible to cancel echo effectively even when the echo arrival time fluctuates due to variation in surrounding conditions.

Further, in the echo canceling system according to the present invention, it is preferable that the arrival time detecting portion calculates a correlation coefficient between the amplitude spectrum of the reference signal and the amplitude spectrum of the echo signal and detects a number of frames as the arrival time in a case where the correlation coefficient is larger than a predetermined threshold. This is because a high correlation implies a high possibility that the echo signal is a wrap-around input with a delay by this number of frames.

Moreover, the present invention is characterized by software that executes the above-mentioned functions of the echo canceling systems as processing operations of a computer. More specifically, the present invention is directed to an echo canceling method to be applied to a full-duplex communication system, and a recording medium storing a computer-executable program for realizing such a method. The method includes detecting a respective echo arrival time of one or plural echo paths based on a reference signal and an echo signal, calculating as many pseudo-echo signals as the detected arrival times, overlapping the calculated pseudo-echo signals to obtain an overall pseudo-echo signal, and subtracting the overall pseudo-echo signal from the echo signal.

With this configuration, the above-described program is loaded and executed on a computer, thus making it possible to realize an echo canceling system that can cancel echo in each echo signal effectively even when there are a plurality of different echo paths, by detecting the echo arrival time for each echo path and generating the pseudo-echo signal according to this echo arrival time.

Furthermore, the present invention is characterized by software that executes the above-mentioned functions of the echo canceling systems as processing operations of a computer. More specifically, the present invention is directed to an echo canceling method to be applied to a full-duplex communication system, and a recording medium storing a computer-executable program for realizing such a method. The method includes performing an orthogonal transformation processing such as an FFT processing for a window length based on a reference signal and an echo signal to obtain an amplitude spectrum and a phase spectrum of each of the reference signal and the echo signal, detecting echo arrival times of one or plural echo paths based on the amplitude spectrum of the reference signal and the amplitude spectrum of the echo signal, calculating as many amplitude spectra of pseudo-echo signals as the detected arrival times, overlapping the calculated amplitude spectra of the pseudo-echo signals to obtain an amplitude spectrum of an overall pseudo-echo signal, subtracting the amplitude spectrum of the overall pseudo-echo signal from the amplitude spectrum of the echo signal to obtain an amplitude spectrum of an echo canceling signal, and performing an inverse orthogonal transformation processing based on the amplitude spectrum of the echo canceling signal and the phase spectrum of the echo signal, followed by an overlap processing, to obtain an echo canceled signal.

With this configuration, the above-described program is loaded and executed on a computer, thus making it possible to realize an echo canceling system that can cancel echo effectively even when the echo arrival time fluctuates due to variation in surrounding conditions, by performing the echo canceling processing using only the amplitude spectrum, which is less susceptible to fluctuations of the arrival times.

DESCRIPTION OF THE PREFERRED EMBODIMENTS

First Embodiment

Figure 5:
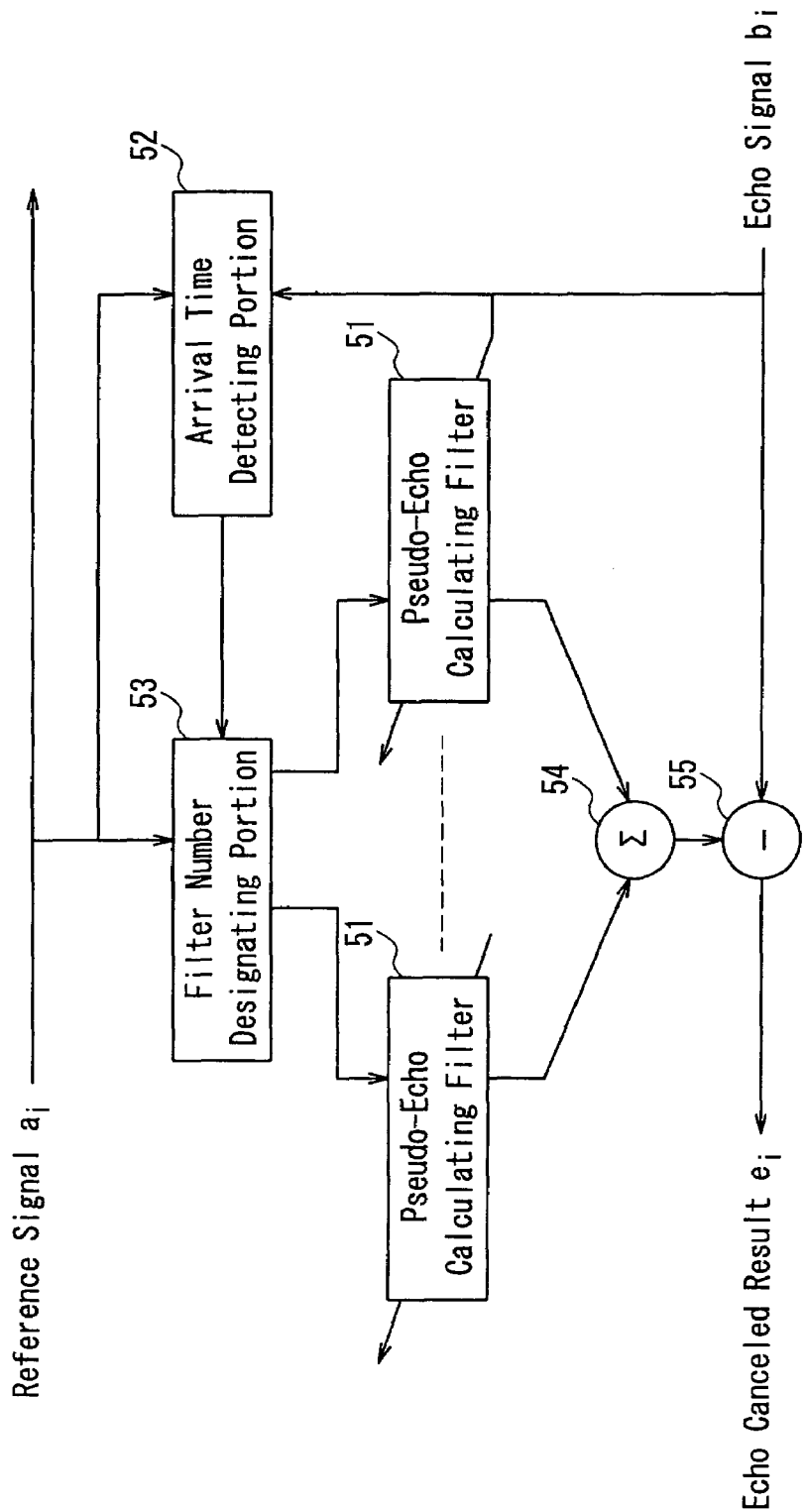
FIG. 5 shows a configuration of an echo canceller in an echo canceling system according to a first embodiment of the present invention.

The following is a description of an echo canceling system according to a first embodiment of the present invention, with reference to the accompanying drawings. FIG. 5 shows a configuration of an echo canceller 15 in the echo canceling system according to the first embodiment of the present invention.

Figure 1:
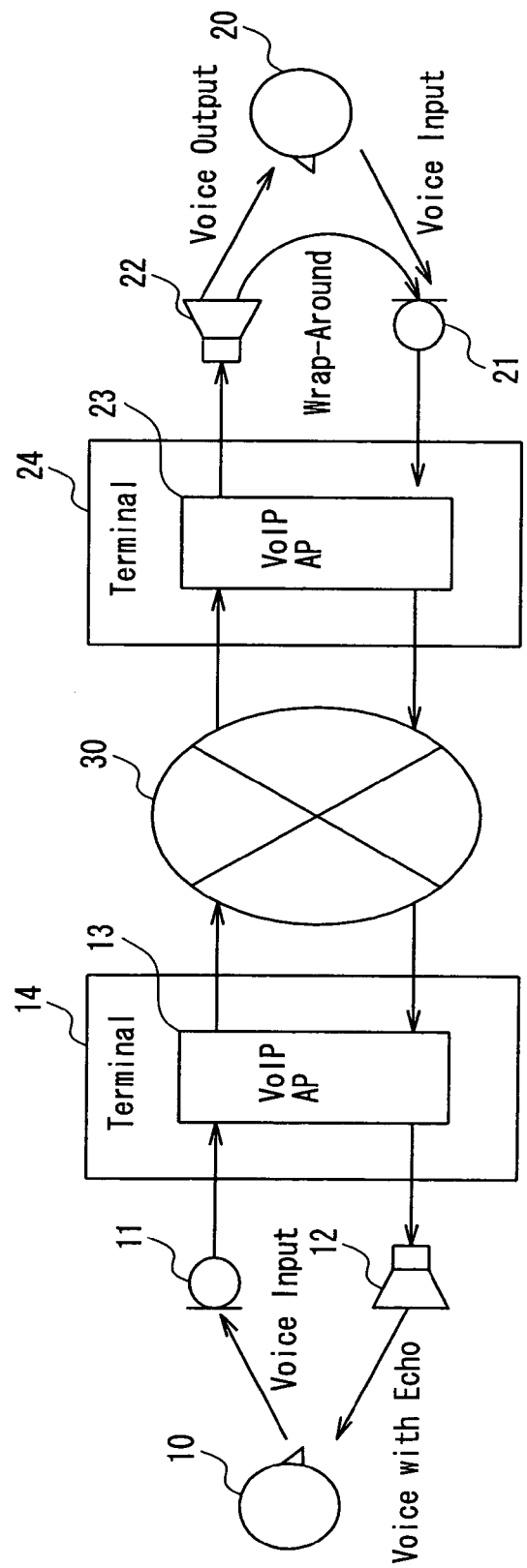
FIG. 1 shows a schematic configuration of a general full-duplex communication system.
Figure 2:
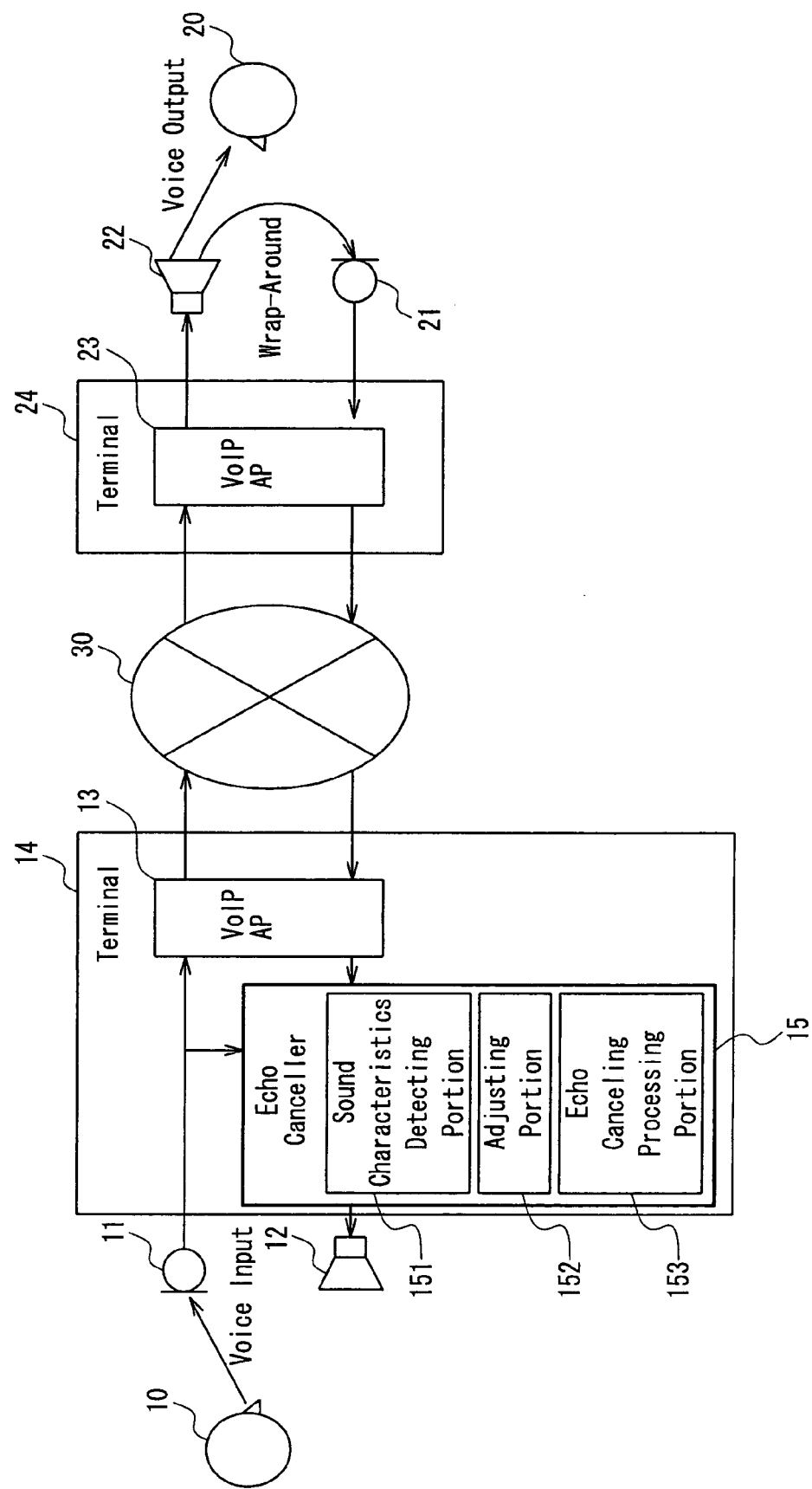
FIG. 2 shows a configuration of a conventional echo canceling system.
Figure 3:
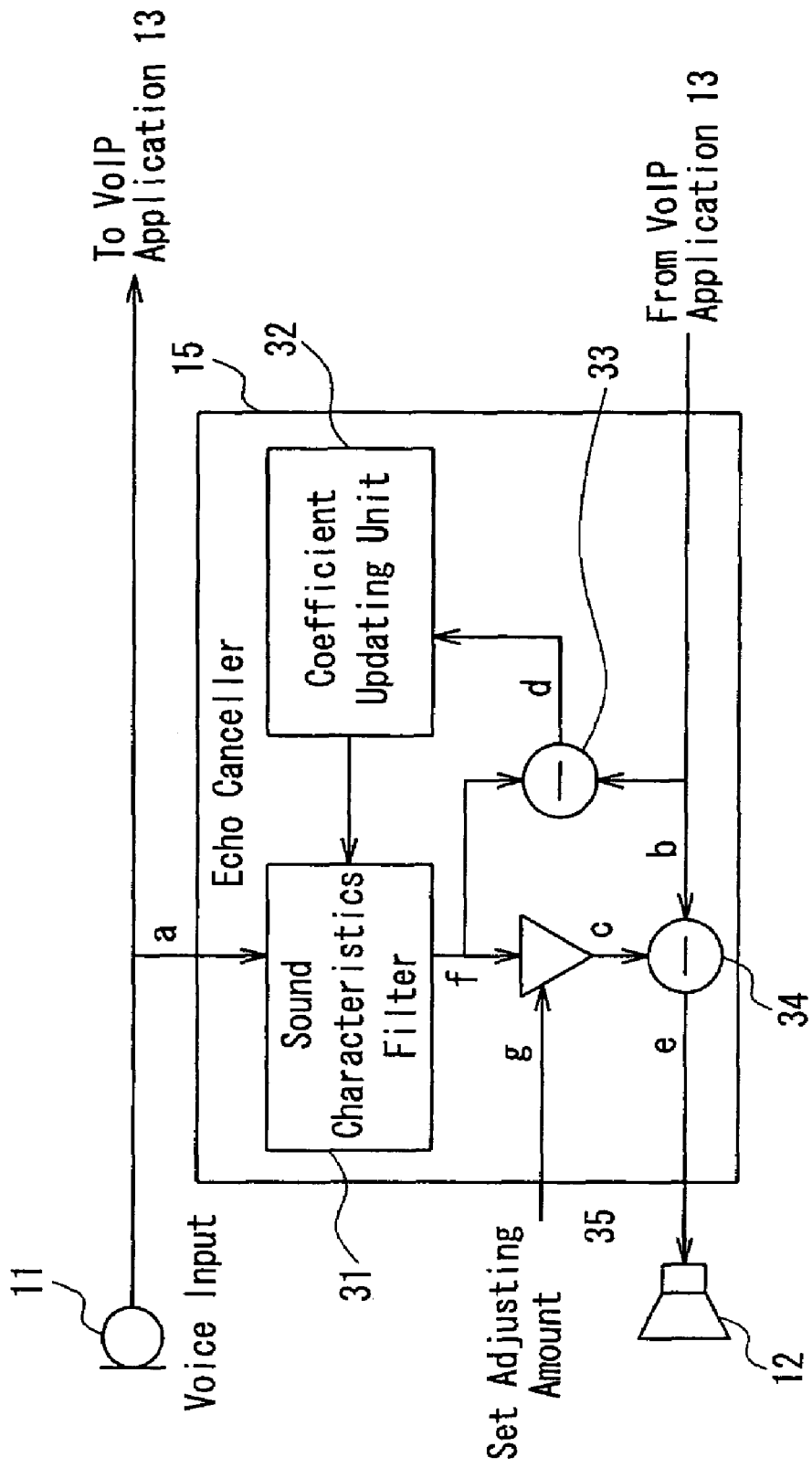
FIG. 3 shows a configuration of a module of an echo canceller in the conventional echo canceling system.
Figure 4:
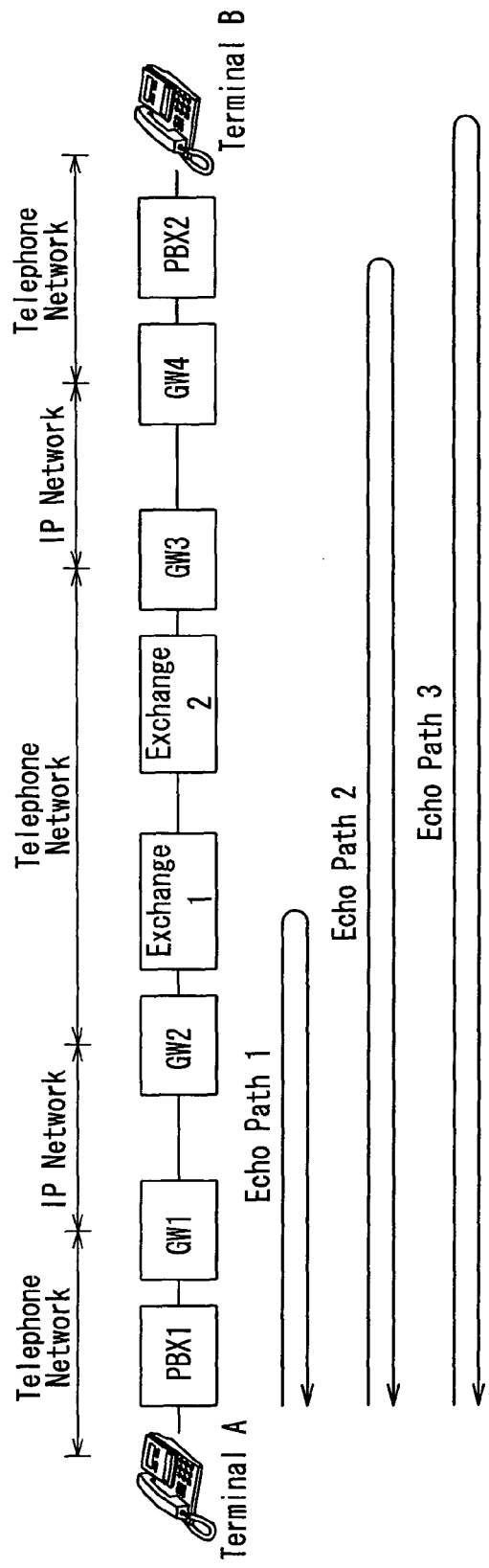
FIG. 4 illustrates echo paths in the conventional echo canceling system.

Although the basic configuration itself of the echo canceller 15 in FIG. 5 is similar to that shown in FIG. 3, the sound characteristics filter 31 including the FIR filter (finite impulse response filter) etc., the coefficient updating unit 32, the subtracting unit 33 and the gain controller 35 are combined and illustrated as a pseudo-echo calculating filter 51 for simplicity.

Furthermore, the first embodiment is characterized in that there are a plurality of these pseudo-echo calculating filters 51 as well as an arrival time detecting portion 52 for detecting an arrival time of an echo and a filter number designating portion 53 for designating the number of the pseudo-echo calculating filters 51 according to the detected arrival times.

In other words, the arrival time detecting portion 52 detects the arrival time of each echo, and the filter number designating portion 53 designates a corresponding number of taps for each detected arrival time. More specifically, an order n indicating the number of samples in the pseudo-echo calculating filter 51 is designated. Then, by providing multiple stages of the pseudo-echo calculating filters 51 having different orders n corresponding to the echo paths, it is possible to obtain an echo canceling effect even when there is more than one echo path.

For detecting the echo arrival times in the arrival time detecting portion 52, a correlation coefficient $corr_d$ between a reference signal $a_i$ and an echo signal $b_i$ can be used, for example. In other words, first, the correlation coefficient $corr_d$ between the reference signal $a_i$ and the echo signal $b_i$ is obtained according to Equation 1.

$$corr_d = \sum_{i=1}^{n} (a_i)_d b_i \qquad \text{Equation 1}$$

where d denotes a difference with respect to a present sample and is a natural number up to $d_{MAX}$. In other words, the correlation coefficient $corr_d$ in Equation 1 is a correlation coefficient between an echo signal $b_i$ in a present sample and an echo signal $(a_i)_d$, which is d samples earlier. For each sample difference d between the reference signal $a_i$ and the echo signal $b_i$, the correlation coefficient $corr_d$ corresponding to each sample difference d is obtained until d reaches $d_{MAX}$. Further, n represents the number of samples used for calculating the correlation coefficient.

Then, the arrival time detecting portion 52 detects a sample difference d whose correlation coefficient $corr_d$ is larger than a predetermined value. In other words, when the correlation with respect to the echo signal $b_i$ arriving d samples later is high, the echo arrival time can be considered d, and thus, d1, d2, . . . , dm (m is a natural number) corresponding to this correlation coefficient $\text{corr}_d$ are obtained as the echo arrival times. The number m of these arrival times corresponds to the number of echo paths. Accordingly, the number of the pseudo-echo calculating filters 51 to be prepared is brought into conformity with this number.

Thereafter, the pseudo-echo signals outputted respectively from the multiple stages of the pseudo-echo calculating filters 51 with different orders n corresponding to the echo paths are combined into a single signal with an adding unit 54, and then this signal is subtracted from the echo signal $b_i$ in a subtracting unit 55, thereby obtaining an echo canceled signal $e_i$ in which the echo is canceled.

Now, as an example of updating the coefficient in the pseudo-echo calculating filter 51 for each echo path, the following description will be directed to the case of updating the coefficient based on an NLMS (normalized least-mean-square) algorithm by using a FIR filter (finite impulse response filter).

An arithmetic processing by the FIR filter can be expressed by Equation 2.

$$c_i = \sum_{j=0}^{n'-1} h_j a_{i-j} \quad \text{Equation 2}$$

($a_i$) represents a reference signal from the microphone 11, namely, an input signal to the FIR filter. ($c_i$) represents an output signal of the FIR filter. The subscript (i) represents a sampling number. ($h_j$) represents a filter coefficient, and n' represents an order. A plurality of the FIR filters with the number of samples, namely, the order n' changed according the arrival times are provided.

Next, the update of the filter coefficient ($h_j$) is expressed by Equation 3.

$$h_j = h_j + \alpha e_i \frac{a_{i-j}}{\|a\|^2} \quad \text{Equation 3}$$

where $$e_i = b_i - c_i$$

$$\|a\|^2 = \sum_{j=0}^{n'-1} a_{i-j}^2$$

α generally is a constant, and 0.0<α<1.0. ($b_i$) represents an echo signal from the system on the conversation partner side. A signal $e_i$ to be transmitted to the loudspeaker 12 is calculated by $e_i = b_i - c_i$, as in Equation 3.

Figure 6:
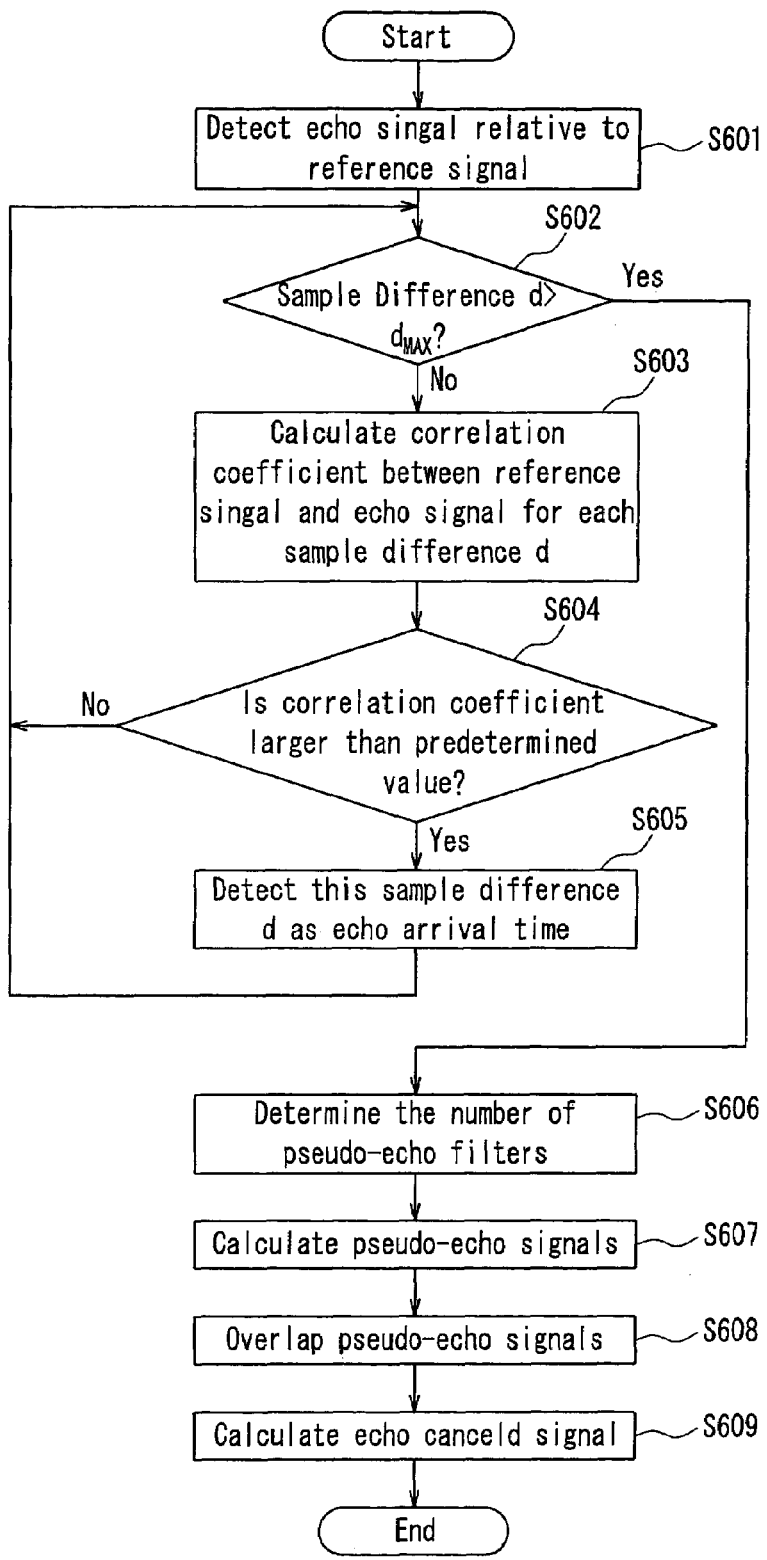
FIG. 6 is a flowchart of an operation in a program realizing the echo canceling system according to the first embodiment of the present invention.

Next, the operation sequence of a program realizing the echo canceling system according to the first embodiment of the present invention will be explained. FIG. 6 is a flowchart of the operation in the program realizing the echo canceling system according to the first embodiment of the present invention.

In FIG. 6, first, the echo signal $b_i$ relative to the reference signal $a_i$ is detected (Operation 601), and until the sample difference d reaches $d_{MAX}$ (Operation 602), the correlation coefficient between the reference signal and the echo signal is calculated for each sample difference d (Operation 603).

Next, when the correlation coefficient is larger than a predetermined value (Operation 604: Yes), the correlation between the signals is judged to be high, so that this sample difference d is detected as an echo arrival time (Operation 605). These operations are repeated until the sample difference d reaches $d_{MAX}$.

Subsequently, according to the detected arrival time, the number of stages of the pseudo-echo filters to be used is determined by designating a plurality of the orders n (Operation 606). Then, pseudo-echo signals $c_i(n)$ for respective stages are calculated (Operation 607).

Finally, the obtained pseudo-echo signals $c_i(n)$ for the respective stages of the pseudo-echo filters are overlapped (Operation 608) and then subtracted from the echo signal $b_i$, thus obtaining the echo canceled signal $e_i$ (Operation 609).

As described above, in accordance with the first embodiment, by detecting the echo arrival time for each echo path and generating the pseudo-echo signal according to this echo arrival time, it is possible to cancel echo in each echo signal effectively even when there are a plurality of different echo paths.

Second Embodiment

Figure 7:
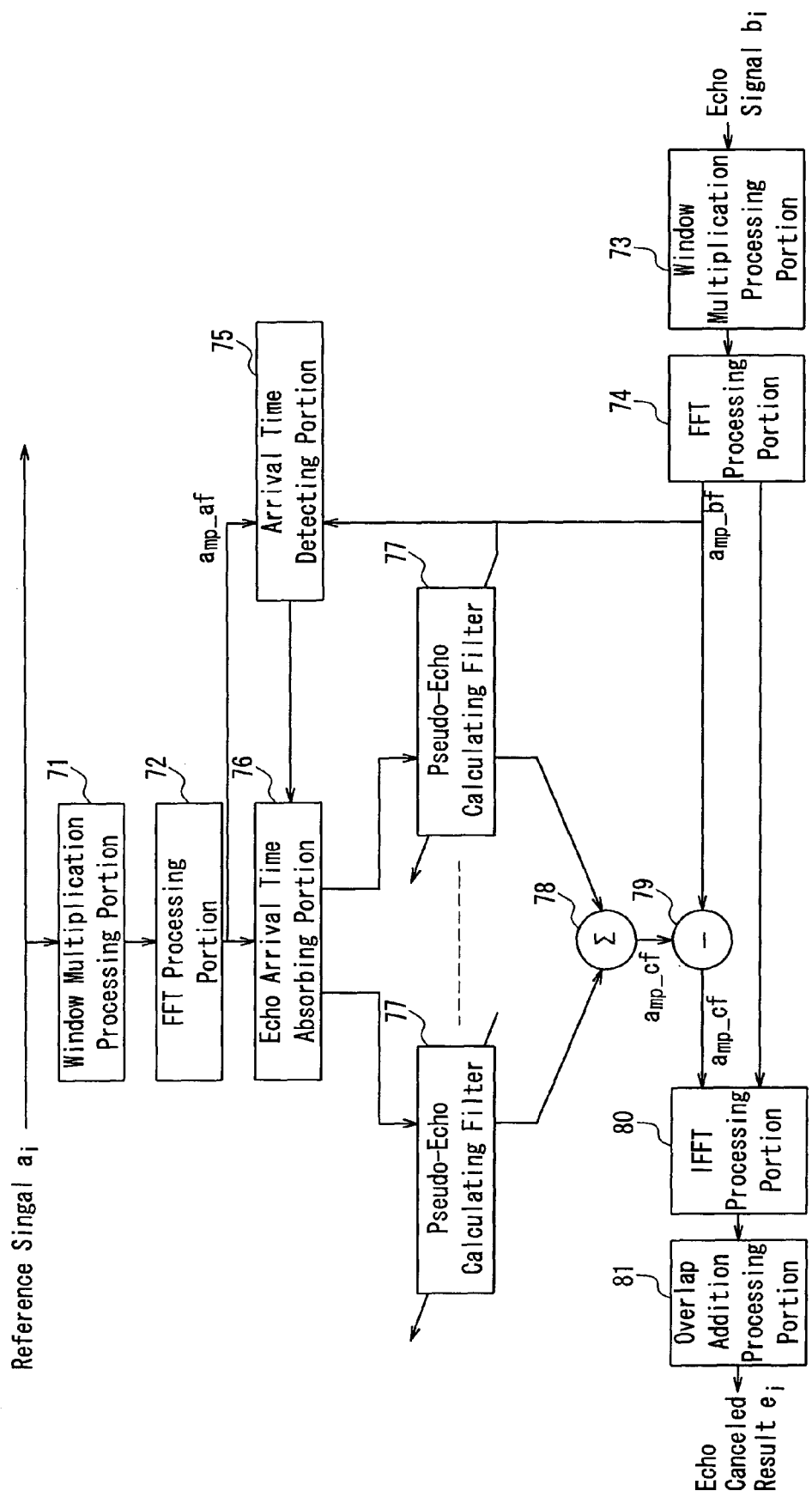
FIG. 7 shows a configuration of an echo canceller in an echo canceling system according to a second embodiment of the present invention.

The following is a description of an echo canceling system according to a second embodiment of the present invention, with reference to the accompanying drawings. FIG. 7 shows a configuration of an echo canceller 15 in the echo canceling system according to the second embodiment of the present invention.

Although the basic configuration itself of the echo canceller 15 in FIG. 7 is similar to that shown in FIG. 3, the sound characteristics filter 31, the coefficient updating unit 32, the subtracting unit 33 and the gain controller 35 are combined and illustrated as a pseudo-echo calculating filter 77 for simplicity, as in the first embodiment.

Unlike the first embodiment, the second embodiment is characterized in that an echo signal $b_i$ relative to a reference signal $a_i$ is processed by an FFT (fast Fourier transform) to obtain an amplitude spectrum and this amplitude spectrum is subjected to an echo canceling processing, thereby obtaining an echo canceled signal $e_i$ without using a phase spectrum, which is susceptible to fluctuations of arrival times.

First, using a Hamming window or a Hanning window, a window multiplication processing portion 71 extracts a signal for one sample corresponding to a window length of FFT based on reference signals $a_i$ in the case where an overlap ratio is 50%. In this embodiment, the FFT processing is carried out in each sample. In addition, although the number of samples within the window length generally is a power of 2, it is set to be n in the present embodiment.

For example, when multiplying the reference signal $a_i$ by a Hanning window $win_i$ so as to extract a signal $a'_i$ corresponding to the window length of FFT, the operation as in Equation 4 is performed.

$$a'_i = a_i win_i \quad \text{Equation 4}$$

where i is any natural number ranging from 1 to n. The Hanning window $win_i$ is calculated according to Equation 5.

$$win_i = \frac{1}{2}\left(1 - \cos\left(\frac{2\pi}{n}i\right)\right) \quad \text{Equation 5}$$

The above-described window multiplication processing to the reference signal $a_i$ also is carried out for the echo signal $b_i$ in a window multiplication processing portion 73.

Next, an FFT processing portion 72 performs an FFT processing of the window length n with respect to the extracted reference signal $a'_i$ and calculates an amplitude spectrum and a phase spectrum for the reference signal $a'_i$ for the window length.

More specifically, the FFT processing portion 72 calculates a complex number $A_f(=Ar_f+jAj_f)$, which is a result of the FFT processing of the extracted reference signal $a'_i$ for the window length, according to Equation 6 and obtains an amplitude spectrum amp_$a_f$, which indicates an amplitude of a signal $A_f$ in a frequency range.

$$\text{amp\_}a_f = \sqrt{Ar_f^2 + Aj_f^2} \qquad \text{Equation 6}$$

In Equation 6, f represents the sample number in the frequency range and is any natural number ranging from 1 to n/2−1 wherein n indicates the window length. Further, $A_f$ is a complex number and consisted of a real axis component $Ar_f$ and an imaginary axis component $Aj_f$. Thus, the amplitude spectrum amp_$a_f$, which indicates the amplitude of the signal $A_f$, is obtained by Equation 6.

The above-described FFT processing to the reference signal $a_i$ also is carried out for the echo signal $b_i$ in an FFT processing portion 74, thus obtaining amp_$b_f$, which indicates an amplitude of the echo signal $b_i$.

Next, the correlation coefficient corr$_d$ between the amplitude spectrum amp_$a_f$ of the reference signal $a_i$ and the amplitude spectrum amp_$b_f$ of the echo signal $b_i$ is obtained according to Equation 7.

$$corr_d = \sum_{f=1}^{n/2-1} (\text{amp\_}a_f)_d \text{amp\_}b_f \qquad \text{Equation 7}$$

where d denotes a difference with respect to a present frame (1 frame=n/2 samples) and is a natural number up to $d_{MAX}$. In other words, the correlation coefficient corr$_d$ in Equation 7 is a correlation coefficient between the amplitude spectrum amp_$b_f$ in a present frame and the amplitude spectrum (amp_$a_f$)$_d$, which is d frames earlier, and the correlation coefficient corr$_d$ corresponding to each frame difference d is obtained until the frame difference d between the reference signal $a_i$ and the echo signal $b_i$ reaches $d_{MAX}$.

Then, an arrival time detecting portion 75 detects a frame difference d whose correlation coefficient corr$_d$ is larger than a predetermined value. In other words, when the correlation with the amplitude spectrum amp_$b_f$ of the echo signal $b_i$ arriving d frames later is high, the echo arrival time can be assumed to be d, and thus, d1, d2, . . . , dm (m is a natural number) corresponding to this correlation coefficient corr$_d$ are obtained as the echo arrival times. The number m of these arrival times corresponds to the number of echo paths. Accordingly, the number of the pseudo-echo calculating filters 77 to be prepared is brought into conformity with this number. Furthermore, an echo arrival time absorbing portion 76 subjects the amplitude spectrum amp_$a_f$ of the reference signal $a_i$ to a delay processing corresponding to each of the echo arrival times d1, d2, . . . , dm (m is a natural number).

Subsequently, the pseudo-echo calculating filters 77 each calculates the amplitude spectrum of a pseudo echo for each of the amplitude spectra amp_$b_f$ of the echo signals $b_i$ corresponding to m arrival times.

In the present embodiment, since the amplitude spectrum is calculated by the FFT processing, the arithmetic operation of the correlation coefficient could fail to converge owing to an influence of an external input other than a wrap-around voice.

Figure 8:
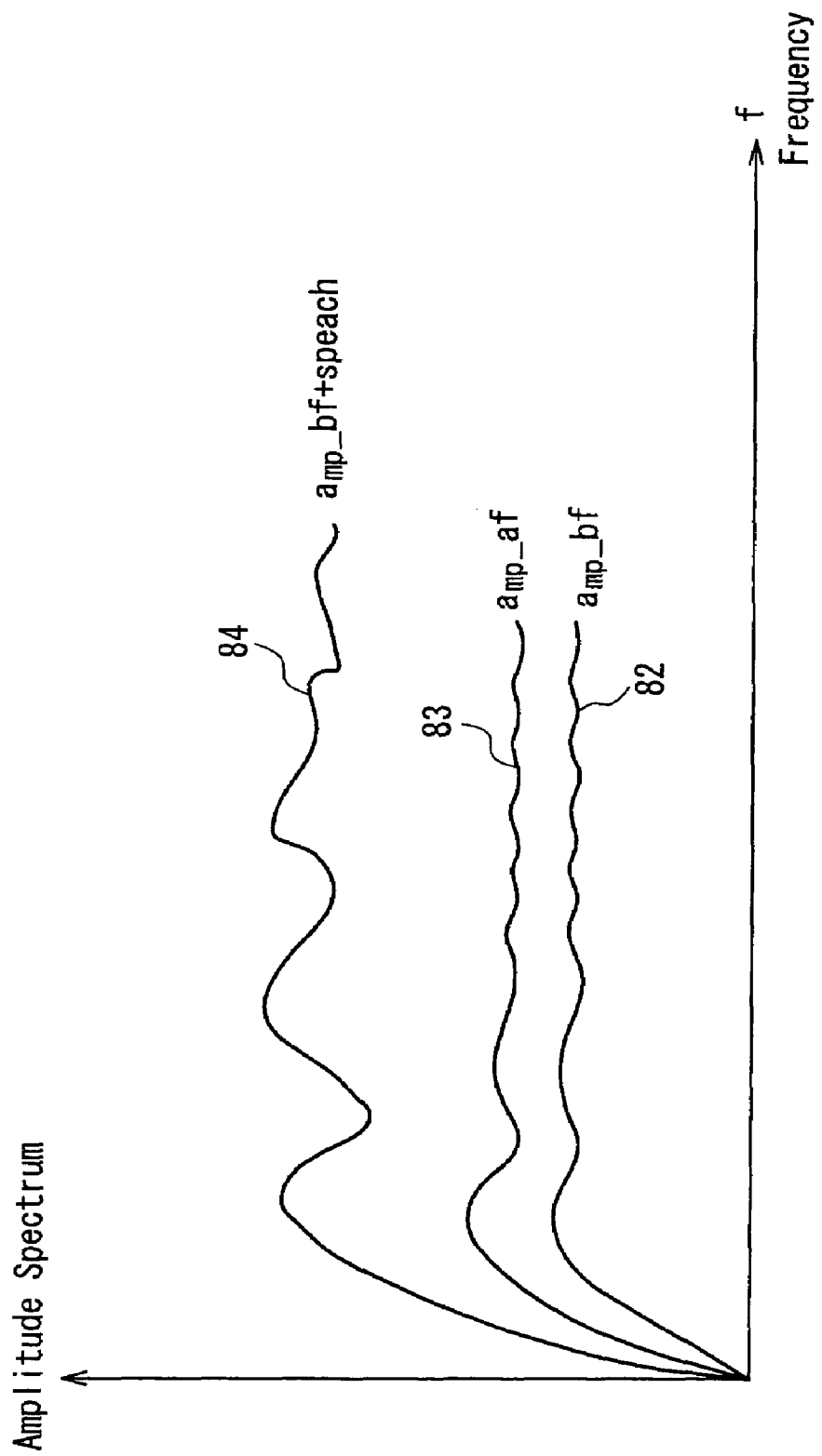
FIG. 8 illustrates a state of double talk.

For example, in the case where an amplitude spectrum amp_$a_f$ 82 of the reference signal $a_i$ and an amplitude spectrum amp_$b_f$ 83 of the echo signal $b_i$ are given as shown in FIG. 8, when an external signal speech is supplied to the amplitude spectrum 83 of the echo signal $b_i$, this generates a signal amp_$b_f$+speech 84, which has lost the correlation with the amplitude spectrum 82 of the reference signal $a_i$. Such a detrimental phenomenon generally is called a double talk.

In order to alleviate the influence of double talk, a gain $(gf)_{dk}$ is calculated using Equation 8 in the second embodiment. Here, k is any natural number ranging from 1 to m and indicates a number of the echo signal. $(gf)'_{dk}$ represents a gain prior to the updating, and β represents an updating coefficient (0.0≦β≦1.0).

$$(gf)_{dk} = \beta(gf)'_{dk} + (1-\beta)\frac{\text{amp\_}b_f(\text{amp\_}a_f)_{dk}}{(\text{amp\_}a_f)^2_{dk}} \qquad \text{Equation 8}$$

By calculating the gain to the amplitude spectrum amp_$a_f$ of the reference signal $a_i$ as shown in Equation 8, even when the external signal speech is included in the amplitude spectrum amp_$b_f$, calculation of the correlation between the amplitude spectrum amp_$a_f$ and the amplitude spectrum amp_$b_f$ can reduce the influence of the external signal speech close to zero. Therefore, it is possible to suppress the influence of the external signal speech effectively.

The gain $(gf)_{dk}$ obtained while the influence of the external signal speech is suppressed is used to calculate the amplitude spectrum of a pseudo echo corresponding to each echo signal $b_i$ as shown in Equation 9. Incidentally, f is any natural number ranging from 1 to n/2−1 in Equation 9.

$$(\text{amp\_}c_f)_{dk} = (gf)_{dk}(\text{amp\_}a_f)_{dk} \qquad \text{Equation 9}$$

Then, an adding unit 78 overlaps the amplitude spectra (amp_$c_f$)$_{dk}$ of the pseudo echoes corresponding to the echo signals $b_i$ calculated by Equation 9, thereby calculating an amplitude spectrum amp_$c_f$ of the overall pseudo echo.

Subsequently, a subtracting unit 79 subtracts the resultant amplitude spectrum amp_$c_f$ of the pseudo echo from the amplitude spectrum amp_$b_f$ of the echo signal $b_i$ as in Equation 10, thereby calculating an amplitude spectrum amp_$e_f$ of the echo signal $b_i$ whose echo has been canceled.

$$\text{amp\_}e_f = \text{amp\_}b_f - \text{amp\_}c_f \qquad \text{Equation 10}$$

Finally, the amplitude spectrum amp_$e_f$ of the echo signal $b_i$ whose echo has been canceled and a phase spectrum of the echo signal $b_i$ calculated in the FFT processing portion 74 are subjected to so-called IFFT (Inverse FFT) in an IFFT processing portion 80. Then, an overlap addition processing portion 81 performs an overlap addition in the same overlap ratio as in the window multiplication processing portions 71 and 73, thereby obtaining an echo canceled result.

Figure 9:
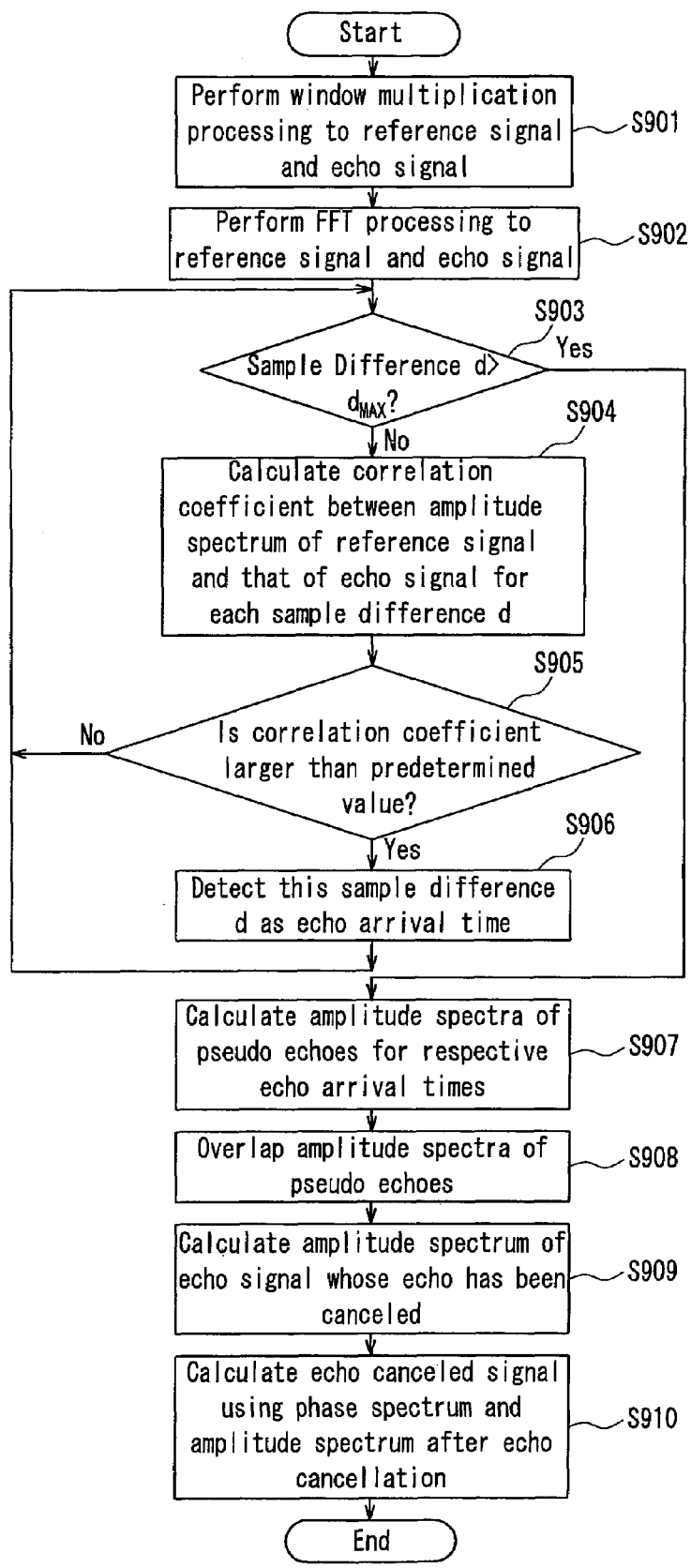
FIG. 9 is a flowchart of an operation in a program realizing the echo canceling system according to the second embodiment of the present invention.

Next, the operation sequence of a program realizing the echo canceling system according to the second embodiment of the present invention will be explained. FIG. 9 is a flowchart of the operation in the program realizing the echo canceling system according to the second embodiment of the present invention.

Referring to FIG. 9, first, a window multiplication processing is carried out using a Hamming window or a Hanning window (Operation 901), thus extracting a signal corresponding to a window length of FFT from the reference signal $a_i$. The echo signal $b_i$ also is subjected to a similar window multiplication processing.

Next, the FFT processing for the window length is carried out with respect to the extracted reference signal and echo signal (Operation 902), thus calculating the amplitude spectrum and the phase spectrum of the reference signal and echo signal corresponding to the window length.

Then, until the sample difference d reaches $d_{MAX}$ (Operation 903), the correlation coefficient between the amplitude spectrum of the reference signal and that of the echo signal is calculated for each sample difference d (Operation 904).

Subsequently, when the correlation coefficient is larger than a predetermined value (Operation 905: Yes), the correlation between the amplitude spectra is judged to be high, so that this sample difference d is detected as an echo arrival time (Operation 906). These operations are repeated until the sample difference d reaches $d_{MAX}$.

Then, the amplitude spectra of the pseudo echoes are individually calculated for the detected echo arrival times (Operation 907), and they are overlapped (Operation 908). In this way, the amplitude spectrum of the overall pseudo echo is obtained.

Thereafter, the resultant amplitude spectrum of the overall pseudo echo is subtracted from the amplitude spectrum of the echo signal, thereby calculating the amplitude spectrum of the echo signal whose echo has been canceled (Operation 909). Finally, the amplitude spectrum of the echo signal whose echo has been canceled and the phase spectrum of the echo signal that has been obtained by the FFT processing are used to be subjected to so-called IFFT processing, followed by the overlap addition in the same overlap ratio as that in the window multiplication processing, thereby obtaining the echo canceled signal (Operation 910).

As described above, in accordance with the second embodiment, by performing the echo canceling processing using only the amplitude spectrum, which is less susceptible to fluctuations of the arrival times, it becomes possible to cancel echo effectively even when the echo arrival time fluctuates due to variation in surrounding conditions.

Figure 10:
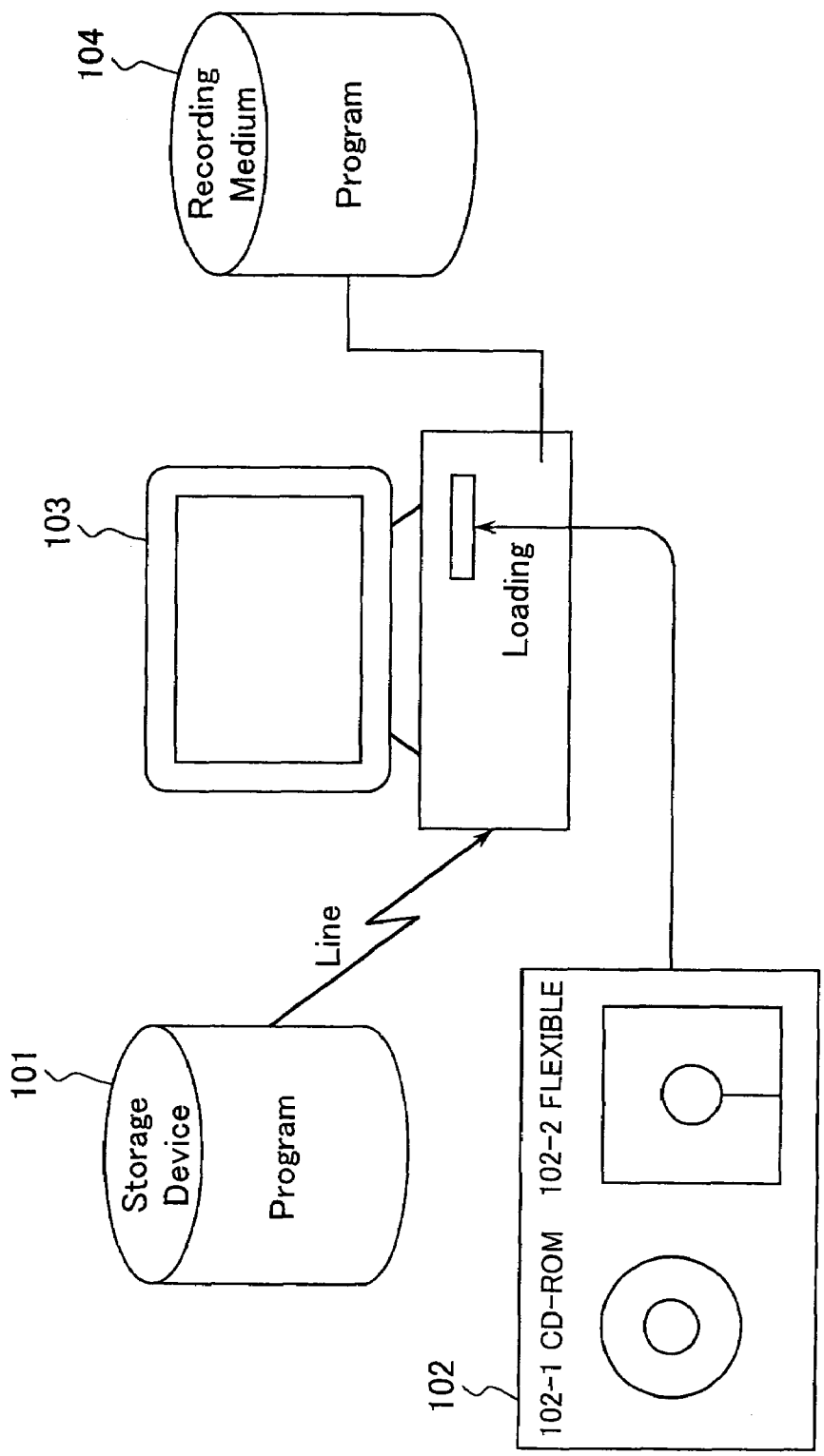
FIG. 10 shows an example of a computer environment.

A program realizing the echo canceling system according to the embodiments of the present invention may be stored as a part of a communications program, as shown in FIG. 10, in any of a portable recording medium 102 such as a CD-ROM 102-1 or a flexible disk 102-2, other storage devices 101 provided at the end of communication lines and a recording medium 104 such as a hard disk or a RAM in a computer 103. When executing the program, this program is loaded and executed in the main memory.

Additionally, the amplitude spectrum etc. calculated by the echo canceling system according to the embodiments of the present invention may be stored, as shown in FIG. 10, in any of a portable recording medium 102 such as a CD-ROM 102-1 or a flexible disk 102-2, other storage devices 101 provided at the end of communication lines and a recording medium 104 such as the hard disk or the RAM in the computer 103. For example, when utilizing a communication system including the echo canceling system according to the present invention, the amplitude spectrum etc. may be read out by the computer 103.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An echo canceling system in a full-duplex communication system, comprising:
   an arrival time detecting portion detecting a respective echo arrival time of each of plural echo paths, based on a reference signal and an echo signal;
   pseudo-echo calculating filters calculating as many pseudo-echo signals as the detected arrival times, a number of the pseudo-echo calculating filters being equal to a number of the detected arrival times;
   an adding unit overlapping the calculated pseudo-echo signals as many times as the detected arrival times to obtain an overall pseudo-echo signal; and
   a subtracting unit subtracting the overall pseudo-echo signal from the echo signal.

2. The echo canceling system according to claim 1, wherein the arrival time detecting portion calculates a correlation coefficient between the reference signal and the echo signal and detects a time difference as the arrival time in a case where the correlation coefficient is larger than a predetermined threshold.

3. An echo canceling system provided in a full-duplex communication system, comprising:
   a window multiplication and orthogonal transformation processing unit performing an orthogonal transformation processing represented by a fast Fourier transform for a predetermined window length based on a reference signal and an echo signal to obtain an amplitude spectrum and a phase spectrum of each of the reference signal and the echo signal;
   an arrival time detecting unit detecting one or plural echo arrival times based on the amplitude spectrum of the reference signal and the amplitude spectrum of the echo signal;
   pseudo-echo calculating filters for calculating as many amplitude spectra of pseudo-echo signals as the detected arrival times;
   an adding unit overlapping the calculated amplitude spectra of the pseudo-echo signals to obtain an amplitude spectrum of an overall pseudo-echo signal;
   a subtracting unit for subtracting the amplitude spectrum of the overall pseudo-echo signal from the amplitude spectrum of the echo signal to obtain an amplitude spectrum of an echo canceling signal; and
   an inverse orthogonal transformation and overlap processing unit performing inverse orthogonal transformation processing based on the amplitude spectrum of the echo canceling signal and the phase spectrum of the echo signal, followed by overlap processing, to obtain an echo canceled signal.

4. The echo canceling system according to claim 3, wherein the arrival time detecting portion calculates a correlation coefficient between the amplitude spectrum of the reference signal and the amplitude spectrum of the echo signal and detects a number of frames as the arrival time in a case where the correlation coefficient is larger than a predetermined threshold.

5. An echo canceling method to be applied to a full-duplex communication system, comprising:
   detecting a respective echo arrival time of each of plural echo paths based on a reference signal and an echo signal;
   calculating as many pseudo-echo signals as the detected arrival times, a number of the pseudo-echo calculating filters being equal to a number of the detected arrival times;

overlapping the calculated pseudo-echo signals as many times as the arrival times to obtain an overall pseudo-echo signal; and subtracting the overall pseudo-echo signal from the echo signal.

6. An echo canceling method to be applied to a full-duplex communication system, comprising:
performing an orthogonal transformation processing represented by a fast Fourier transform for a predetermined window length based on a reference signal and an echo signal to obtain an amplitude spectrum and a phase spectrum of each of the reference signal and the echo signal;
detecting echo arrival times of one or plural echo paths based on the amplitude spectrum of the reference signal and the amplitude spectrum of the echo signal;
calculating as many amplitude spectra of pseudo-echo signals as the detected arrival times;
overlapping the calculated amplitude spectra of the pseudo-echo signals to obtain an amplitude spectrum of an overall pseudo-echo signal;
subtracting the amplitude spectrum of the overall pseudo-echo signal from the amplitude spectrum of the echo signal to obtain an amplitude spectrum of an echo canceling signal; and
performing an inverse orthogonal transformation processing based on the amplitude spectrum of the echo canceling signal and the phase spectrum of the echo signal, followed by an overlap processing, to obtain an echo canceled signal.

7. A recording medium storing a computer-readable and -executable program to control the computer to perform an echo canceling method, to be applied to a full-duplex communication system, by:
detecting a respective echo arrival time of each of plural echo paths, based on a reference signal and an echo signal;
calculating as many pseudo-echo signals as the detected arrival times, the number of the pseudo-echo calculations being equal to a member of the detected arrival times;
overlapping the calculated pseudo-echo signals as many times as the detected arrival times to obtain an overall pseudo-echo signal; and
subtracting the overall pseudo-echo signal from the echo signal.

8. A recording medium storing a computer-executable program for realizing an echo canceling method to be applied to a full-duplex communication system, the program comprising;
performing an orthogonal transformation processing represented by a fast Fourier transform for a predetermined window length based on a reference signal and an echo signal to obtain an amplitude spectrum and a phase spectrum of each of the reference signal and the echo signal;
detecting one or plural echo arrival times of one or plural echo paths based on the amplitude spectrum of the reference signal and the amplitude spectrum of the echo signal;
calculating as many amplitude spectra of pseudo-echo signals as the detected arrival times;
overlapping the calculated amplitude spectra of the pseudo-echo signals to obtain an amplitude spectrum of an overall pseudo-echo signal;
subtracting the amplitude spectrum of the overall pseudo-echo signal from the amplitude spectrum of the echo signal to obtain an amplitude spectrum of an echo canceling signal; and
performing an inverse orthogonal transformation processing based on the amplitude spectrum of the echo canceling signal and the phase spectrum of the echo signal, followed by an overlap processing, to obtain an echo canceled signal.

* * * * *

UNITED STATES PATENT AND TRADEMARK OFFICE
CERTIFICATE OF CORRECTION

PATENT NO. : 7,324,466 B2
APPLICATION NO. : 10/648319
DATED : January 29, 2008
INVENTOR(S) : Naoshi Matsuo It is certified that error appears in the above-identified patent and that said Letters Patent is hereby corrected as shown below:

On the title page:

Column 2 (Primary Examiner), Line 1, change "Ramnandam" to --Ramnandan--.

Column 12, Line 35, after "filters" delete "for".

Column 12, Line 41, after "unit" delete "for".

Column 14, Line 11, change "comprising;" to --comprising:--.

Signed and Sealed this

Eighth Day of July, 2008

JON W. DUDAS
*Director of the United States Patent and Trademark Office*